United States Patent
Olsta et al.

(10) Patent No.: US 11,673,117 B2
(45) Date of Patent: Jun. 13, 2023

(54) GEOTEXTILE SEDIMENT CAP WITH ACTIVE MEDIA

(71) Applicant: HUESKER, INC., Charlotte, NC (US)

(72) Inventors: James Thomas Olsta, Bartlett, IL (US); Kristof Benedikt Klaus Thimm, Muenster (DE); Lilma Ribeiro Schimmel, Fort Mill, SC (US)

(73) Assignee: Huesker, Inc., Charlotte, NC (US)

( * ) Notice: Subject to any disclaimer, the term of this patent is extended or adjusted under 35 U.S.C. 154(b) by 273 days.

(21) Appl. No.: 16/183,465

(22) Filed: Nov. 7, 2018

(65) Prior Publication Data

US 2019/0134605 A1 May 9, 2019

Related U.S. Application Data

(60) Provisional application No. 62/583,139, filed on Nov. 8, 2017.

(51) Int. Cl.
| | |
|---|---|
| *B01J 20/28* | (2006.01) |
| *B01J 20/02* | (2006.01) |
| *C02F 103/06* | (2006.01) |
| *C02F 1/28* | (2023.01) |

(52) U.S. Cl.
CPC ........... *B01J 20/2805* (2013.01); *B01J 20/02* (2013.01); *B01J 20/28011* (2013.01); *B01J 20/28016* (2013.01); *C02F 1/288* (2013.01); *C02F 1/281* (2013.01); *C02F 1/283* (2013.01); *C02F 2103/06* (2013.01)

(58) Field of Classification Search
CPC .................. B01J 20/02; B01J 20/28011; B01J 20/28016; B01J 20/2805; C02F 1/281; C02F 1/283; C02F 1/288; C02F 2103/06
See application file for complete search history.

(56) References Cited

U.S. PATENT DOCUMENTS

| | | |
|---|---|---|
| 5,601,906 A | 2/1997 | Henry |
| 7,128,498 B2 | 10/2006 | Sheahan et al. |
| 7,309,189 B2 | 12/2007 | Khire |
| 7,670,082 B2 | 3/2010 | Olsta et al. |
| 7,682,105 B2 | 3/2010 | Ayers et al. |
| 7,870,965 B2 * | 1/2011 | Cronia ............... B01J 20/28028 210/502.1 |
| 7,981,296 B2 | 7/2011 | Cronia et al. |
| 8,042,696 B2 | 10/2011 | Olsta et al. |
| 9,598,299 B2 | 3/2017 | Rennard et al. |

(Continued)

FOREIGN PATENT DOCUMENTS

WO   WO 2016/010697 A1    1/2016

OTHER PUBLICATIONS

Triton® Marine Mattress Installation Guide (Year: 2013).*

(Continued)

*Primary Examiner* — Patrick Orme
(74) *Attorney, Agent, or Firm* — KDW Firm PLLC

(57) ABSTRACT

Remediation geotextile device, including a geotextile mattress-like component, configured to contain an active granular material for filtering and treating contaminated groundwater and/or sediment porewater. The geotextile device including a six-sided, or substantially rectangular, mattress-like component, including an upper geotextile layer and a lower geotextile layer that are connected at intervals with sets of interior geotextile straps.

26 Claims, 3 Drawing Sheets

(56) References Cited

U.S. PATENT DOCUMENTS

| | | | |
|---|---|---|---|
| 9,611,626 B2 | 4/2017 | Pettey | |
| 2008/0245710 A1* | 10/2008 | Mitchell | C02F 1/288 |
| 2009/0169311 A1 | 7/2009 | Sharley et al. | |
| 2010/0222481 A1 | 9/2010 | Jersak et al. | |
| 2015/0041409 A1 | 2/2015 | Grubb et al. | |
| 2016/0251842 A1* | 9/2016 | Miles | E03F 1/002 |
| | | | 210/767 |

OTHER PUBLICATIONS

Zhang, et al., "Active capping technology: a new environmental remediation of contaminated sediment," Environmental Science and Pollution Research, vol. 23, 4370-86 (Year: 2016).*
AquaBlok Specification Sheet (Year: 2011).*
UX Triton 200 Geogrid Product Specification (Year: 2013).*
Maxwell Supply (Year: 2016).*
Gardner (2017) "Development and Evaluation of Reactive Capping Mat for Sequestration of Contaminants in Sediments," University of New Hampshire, Environmental Research Group, pp. 1-3.
Kalinovich et al., "The application of geotextile and granular filters for PCB remediation," Geosynthetics International, vol. 15, No. 3, pp. 173-183 (2008).
Meric et al., "Model Prediction of Long-Term Reactive Core Mat Efficacy for Capping Contaminated Aquatic Sediments," Journal of Environmental Engineering, vol. 139, No. 4, pp. 564-575 (2013).

* cited by examiner

GEOTEXTILE SEDIMENT CAP WITH ACTIVE MEDIA

CROSS-REFERENCE TO RELATED APPLICATION

This application claims benefit of U.S. Provisional Patent Application Ser. No. 62/583,139, filed Nov. 8, 2017, which is incorporated herein by reference in its entirety.

FIELD OF THE INVENTION

The presently disclosed subject matter is directed to remediation geotextile devices, including geotextile mattress-like components, configured to filter and treat contaminated liquids. More particularly, the subject matter disclosed herein relates to a geotextile composite in the form of a mattress which can be filled with active particles permitting the geotextile mattress to be oriented in a horizontal or inclined position to perform filtration and treatment on contaminated liquids flowing through the geotextile mattress.

BACKGROUND

Containment and purification of contaminated groundwater and sediment porewater has become a major environmental concern. Industrial pollution and more severely, industrial accidents, often pollute sediments in streams, rivers, lakes and other bodies of water. When such releases occur in waterways, the contaminants often settle onto the sediments. Groundwater flowing up through the contaminated sediment can continually transport contaminants into the waterway. Also, benthic organisms can ingest contaminants from the sediment porewater. The result can be passing of contaminants up through the food chain to fish and then to humans.

To combat these issues, conventional isolation or treatment of contaminated soils and sediments has been achieved by either "capping" or removal. Capping can use natural materials such as soils or gravel, or geosynthetic layers, or a combination of any of these. Geotextile geocomposites have been used for sediment capping. However, depending upon the groundwater flow, these composites have failed to provide effective treatment due to a number of factors, including for example, insufficient contact time with an active media to achieve adsorption, absorption, or sequestration of the contaminant. Moreover, some systems, including a proposed gabion system, can be difficult and time consuming to manufacture and implement.

Therefore, there is an unmet need for devices, systems and/or methods for filtering and treating contaminated groundwater and/or sediment porewater. Embodiments of the presently disclosed subject matter address the above deficiencies in a cost-efficient manner.

SUMMARY

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

In some embodiments, a filtration system comprises at least one layer of active material (e.g., a chemically active layer) that is installed between (e.g., sandwiched) opposing layers of one or more geosynthetic materials. The resulting composite filtration system can form a geotextile device or mattress-like device containing the active material and configured to form a barrier that can treat contaminants (e.g., contaminants in sediment, in groundwater, or porewater). The active material can be configured as an active "clean-up" element that concentrates contaminants, neutralizes contaminants, or both, from the surface(s) against which the filtration system is installed. Moreover, in some aspects, such a filtration system can isolate contaminated sediment from water passing thereover, therethrough, or therearound, and, furthermore, can remove contaminants that otherwise would be leached into such streams or bodies of water from such contaminated soil, sediment, and the like. Such a filtration system can be installed in-place at a site where active treatment or "capping" is needed to prevent leaching of contaminants into a stream or body of water.

In accordance with the instant disclosure, remediation filtration systems, including geotextile mattresses or mattress-like components, configured to filter contaminants from a flow of a liquid (e.g., from water leaching from soil and/or sediment into a stream or body of water) and methods of using the same are provided. According to one aspect, a six-sided geotextile mattress comprises an upper geotextile layer, a lower geotextile layer and sets of, or a plurality of, interior straps (e.g., made of a geosynthetic material that is the same, or different from, the material comprising the upper and/or lower layers of the mattress) of sufficient length and spacing to provide a substantially uniform thickness of the geotextile mattress when filled with active granular material. In some such embodiments, the interior straps are spaced apart at a distance to maintain a thickness of the mattress within a range, such as, for example, ±1%, ±5%, ±10%, ±25%, or any suitable thickness variation for a given installation. In some embodiments, the upper and lower layers are connected by one or more lateral side walls, which can also be made of the geosynthetic material, such that the one or more lateral side walls are oriented substantially orthogonally to the upper and lower layers when these layers/sides are not bowed out from supporting the filtration media contained therein.

In another aspect, the subject matter described herein includes methods for filtering groundwater and/or sediment porewater to reduce or substantially reduce the concentration of at least one contaminant therefrom, the method comprising providing a geotextile mattress as disclosed herein. Disclosed methods can also include allowing passage of a liquid through the geotextiles and a sufficient thickness of a filtration media (e.g., comprising active particles) contained within the geotextile devices and/or mattresses such that the liquid is in contact with the filtration media a sufficient time to result in reduced contaminant concentrations in the groundwater and/or sediment porewater.

An object of the presently disclosed subject matter having been stated hereinabove, which is achieved in whole or in part by the presently disclosed subject matter, other objects will be evident as the description proceeds when taken regarding the accompanying drawings, as described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

DETAILED DESCRIPTION

Figure 1:
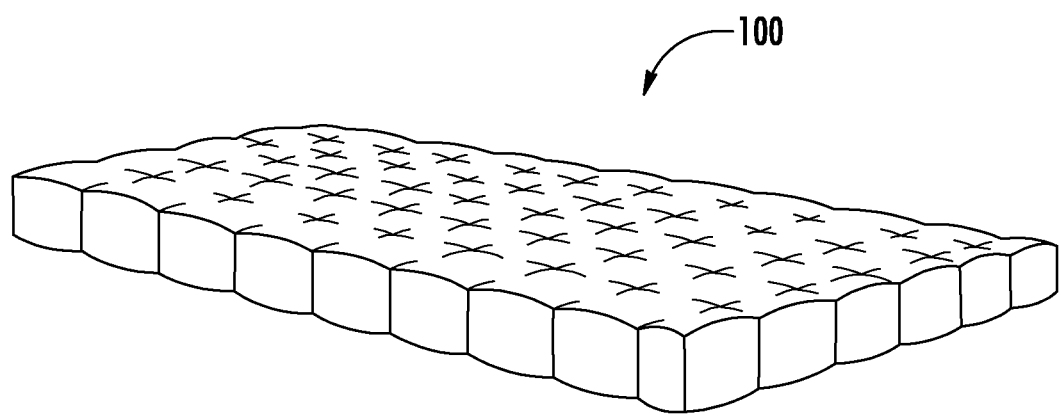
FIG. 1 is a perspective view of an example embodiment of a filtration system comprising a geosynthetic outer cover filled to a substantially consistent thickness with an activated filtration media, in accordance with the disclosure herein.

The presently disclosed subject matter now will be described more fully hereinafter, in which some, but not all, example embodiments of the presently disclosed subject matter are described and shown in the accompanying figures. Each example embodiment is provided to explain the subject matter and not as a limitation. In fact, features illustrated or described as part of one embodiment can be used in conjunction with one or more features described in another embodiment to yield still a further embodiment. As such, it is intended that the present disclosure will cover and read on such modifications and variations. Indeed, the presently disclosed subject matter can be embodied in many different forms and should not be construed as limited to the embodiments set forth herein; rather, these embodiments are provided so that this disclosure will satisfy applicable legal requirements.

In some embodiments, a filtration system comprises at least one layer of active material (e.g., a chemically active layer) that is installed between (e.g., sandwiched) opposing layers of one or more geosynthetic materials. The resulting composite filtration system can form a geotextile device or mattress-like device containing the active material and configured to form a barrier that can treat contaminants (e.g., contaminants in sediment, in groundwater, or porewater). The active material can be configured as an active "cleanup" element that concentrates contaminants, neutralizes contaminants, or both, from the surface(s) against which the filtration system is installed. Moreover, in some aspects, such a filtration system can isolate contaminated sediment from water passing thereover, therethrough, or therearound, and, furthermore, can remove contaminants that otherwise would be leached into such streams or bodies of water from such contaminated soil, sediment, and the like. Such a filtration system can be installed in-place at a site where active treatment or "capping" is needed to prevent leaching of contaminants into a stream or body of water.

In accordance with the instant disclosure, remediation filtration systems, including geotextile mattresses or mattress-like components, configured to filter contaminants from a flow of a liquid (e.g., from water leaching from soil and/or sediment into a stream or body of water) and methods of using the same are provided. According to one aspect, a multi-sided or six-sided geotextile mattress comprises an upper geotextile layer, a lower geotextile layer and sets of, or a plurality of, interior straps (e.g., made of a geosynthetic material that is the same, or different from, the material comprising the upper and/or lower layers of the mattress) of sufficient length and spacing to provide a substantially uniform thickness of the geotextile mattress when filled with a material such as for example an active granular material. In some such embodiments, the interior straps are spaced apart at a distance to maintain a thickness of the mattress within a range, such as, for example, ±1%, ±5%, ±10%, ±25%, or any suitable thickness variation for a given installation. In some embodiments, the upper and lower layers are connected by one or more lateral side walls, which can also be made of the geosynthetic material, such that the one or more lateral side walls are oriented substantially orthogonally to the upper and lower layers when these layers/sides are not bowed out from supporting the filtration media contained therein.

According to another aspect, the subject matter described herein includes methods for filtering groundwater and/or sediment porewater to reduce or substantially reduce the concentration of at least one contaminant therefrom, the method comprising providing a geotextile mattress as disclosed herein. Disclosed methods can also include allowing passage of a liquid through the geotextiles and a sufficient thickness of a filtration media (e.g., comprising active particles) contained within the geotextile devices and/or mattresses such that the liquid is in contact with the filtration media a sufficient time to result in reduced contaminant concentrations in the groundwater and/or sediment porewater.

An object of the presently disclosed subject matter having been stated hereinabove, and which is achieved in whole or in part by the presently disclosed subject matter, other objects will be evident as the description proceeds when taken regarding the accompanying drawings as best described herein below.

Any water permeable geotextile material, such as, for example, polyolefins, polyethylene, polyamide, polypropylene, polyester, rayon, nylon, and/or copolymers, can be used to form the one or more sides and/or layers of the filtration system, including, for example, one or more of the six sides of a geotextile mattress, as disclosed herein. In some embodiments, woven geotextiles can be utilized in the disclosed devices. When woven geotextiles are used, the yarns in the machine direction can be a different polymer than yarns in the cross-machine direction.

In some embodiments, the plurality of interior geotextile straps have a sufficient length and spacing to provide a substantially uniform thickness (e.g., ±1%, ±5%, ±10%, ±25%) of the geotextile mattress when filled with the filtration media (e.g., an active granular material). In some such embodiments, the plurality of interior geotextile straps can comprise high-strength geotextile straps of a same or similar (e.g., ±1%, ±5%, ±10%, ±25%) length to maintain the substantially uniform thickness. In some embodiments, the plurality of interior geotextile straps are equally spaced in a grid pattern configured to provide the substantially uniform cross-sectional thickness of the geotextile mattress after filling the filtration system/mattress. In some embodiments, the internal spacing of the interior geotextile straps can have a non-uniform distribution within the filtration system/mattress to counteract, for example, any external factors (e.g., gravity) that would cause the filtration media to exert increased pressure within portions of the filtration system/mattress. As such, the filtration system/mattress may have a non-uniform internal construction, which may, in some cases, be mirrored about one or more planes of symmetry.

In some embodiments, the mass per area of the geotextiles can range from about 100 grams/square meter (g/m$^2$) to about 800 g/m$^2$. In some embodiments, the filtration media has a particle size such that at least 90% of the particles are in the range of about 4 to about 200 mesh. In some embodiments, the disclosed geotextile mattresses can be filled with a granular active material as the filtration media, such granular active materials comprising, for example, activated carbon, apatite, iron sulfide, organophilic clay, siderite, zeolite, zero valent iron, and mixtures thereof. The types of granular active material used as the filtration media are not limited to the examples provided herein. In some embodiments, sand can also be mixed with the active material prior to, or simultaneous with, the filling of the filtration system/mattress. In some embodiments, the granular active material is selected from the group consisting of activated carbon, apatite, iron sulfide, organophilic clay, siderite, zeolite, zero valent iron, and mixtures thereof. In some embodiments, the mattress is filled with filtration media to a density of about 20 pounds per cubic foot (lb/ft$^3$) to about 200 lb/ft$^3$, for example, of any suitable granular active material(s).

The disclosed filtration systems, including geotextile mattresses or mattress-like components, can, in some embodiments, be filled with a slurry of granular active material and water. The permeable geotextile material or materials incorporated into the disclosed filtration systems can, in some embodiments, allow for the release of water from the slurry during the filling process, leaving primarily the granular active material between the geotextile layers. Alternatively, in some embodiments the disclosed filtration systems and mattresses can be filled pneumatically (e.g., with granular active material mixed with, and carried by, a stream of air). In such embodiments, the permeable nature of the geotextile materials allows for the air to pass therethrough during the filling process, leaving primarily the granular active material between the geotextile layers.

In some embodiments, methods of manufacturing such filtration devices, as disclosed herein, can comprise filling the filtration devices, including geotextile mattresses or mattress-like components, with active material to achieve a controlled or desired thickness of the filtration system. In some embodiments, by altering the length of one or more of (e.g., a plurality of) the interior straps within the filtration system (e.g., between about 8 centimeters (cm) and about 60 cm), a substantially uniform thickness can be produced for the filtration system. The filtration system is fabricated such that, prior to filling, it has desired dimensions, for example, an upper and/or lower surface of about 5 meters (m) wide by about 200 m long.

Additionally, in some aspects, impermeable flaps can be adhered onto a portion of the mattress of a filtration system disclosed herein, including, for example, at one or more bottom side edges of a geotextile mattress. When the filtration devices (e.g. mattresses) are installed adjacent each other (e.g., side-by-side), but not in direct contact, such impermeable flaps can block a flow of water between adjacent mattresses and force the liquid (e.g., groundwater) to flow through the active material filled area within the filtration system. The flaps can be, in some embodiments, about 3 cm to about 30 cm long, such that they can, but do not necessarily have to, completely block lateral fluid flow between adjacent mattresses comprising a single filtration system. In some such embodiments, the impermeable flaps may have a height that is less than a thickness of the mattress of the filtration system, thereby allowing fluid flow between adjacent mattresses after the fluid flow has passed through a predefined thickness of said mattress. These impermeable flaps can be made from any suitable material, including, for example, sheets of any one of the following polymers: polyethylene, polypropylene, chlorosulfonated polyethylene, and/or poly vinyl chloride. The type of material from which the impermeable flaps can be made is not limited to those disclosed herein. The impermeable flaps can be adhered to the mattress in any suitable manner, including, for example, by sewing, gluing, heat welding, or mechanical attachment to the mattress.

The presently disclosed geotextile devices, including geotextile mattresses or mattress-like components, provide significant advantages over existing technologies. For example, existing sediment caps do not provide a geotextile with sufficient thickness to allow adequate filtration and active media contact to properly treat waste water, groundwater, or porewater. In contrast, the present disclosure provides filtration systems, including geotextile-based mattresses or mattress-like components, that are suitable for optimal contaminant remediation due, at least in part, to internal straps that can provide for an active filtration media with a substantially uniform thickness of up to, for example, about 60 cm.

Similarly, another advantage of the presently disclosed geotextile devices, including geotextile mattresses or mattress-like components, is ease of set-up and installation at a site requiring remediation of environmental contamination. For example, the disclosed filtration system can comprise a plurality of geotextile mattress that can be prefabricated in a factory or other off-site facility, shipped to the site of installation, and relatively quickly filled with active material in at the site by pneumatic conveyance or pumping into the mattresses in a slurry. In contrast, existing technologies are mechanically complex and time consuming to assemble in the field.

Another advantage of the presently disclosed geotextile devices, including geotextile mattresses or mattress-like components, is the erosion protection and deformation resistance provided by its configuration and strength properties, compared to existing technologies.

By way of example only, and without limitation, aspects of the disclosed geotextile devices, including geotextile mattresses or mattress-like components, are further illustrated in the figures below. FIG. 1 is a perspective view of at least one embodiment of a filtration system comprising a geotextile mattress, generally designated 100, showing the substantially uniform thickness of the mattress 100 when it is filled with the filtration media (e.g., granular active material).

Figure 2:
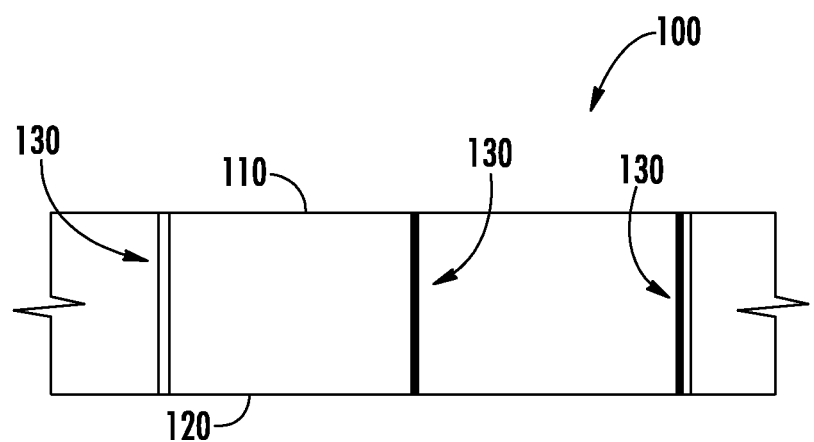
FIG. 2 is a schematic internal side view of the filtration system of FIG. 1, in accordance with the disclosure herein.

FIG. 2 is a schematic cross-sectional view of an embodiment of the presently disclosed geotextile mattress 100, further showing top geotextile layer 110 and bottom geotextile layer 120, which are internally connected (e.g., through the thickness of mattress 100) at intervals, which can be uniformly or non-uniformly spaced, with one or more interior straps, generally designated 130. As noted elsewhere herein, the interior straps can be made from the same geotextile material as the top geotextile layer 110 and/or the bottom geotextile layer 120. As illustrated in the example embodiment of FIG. 2, the thickness and/or quantity of interior straps 130 can be varied at one or more positions within the mattress 100 at which the top geotextile layer 110 and the bottom geotextile layer 120 are connected together internal to the mattress by the interior straps 130.

Figure 3:
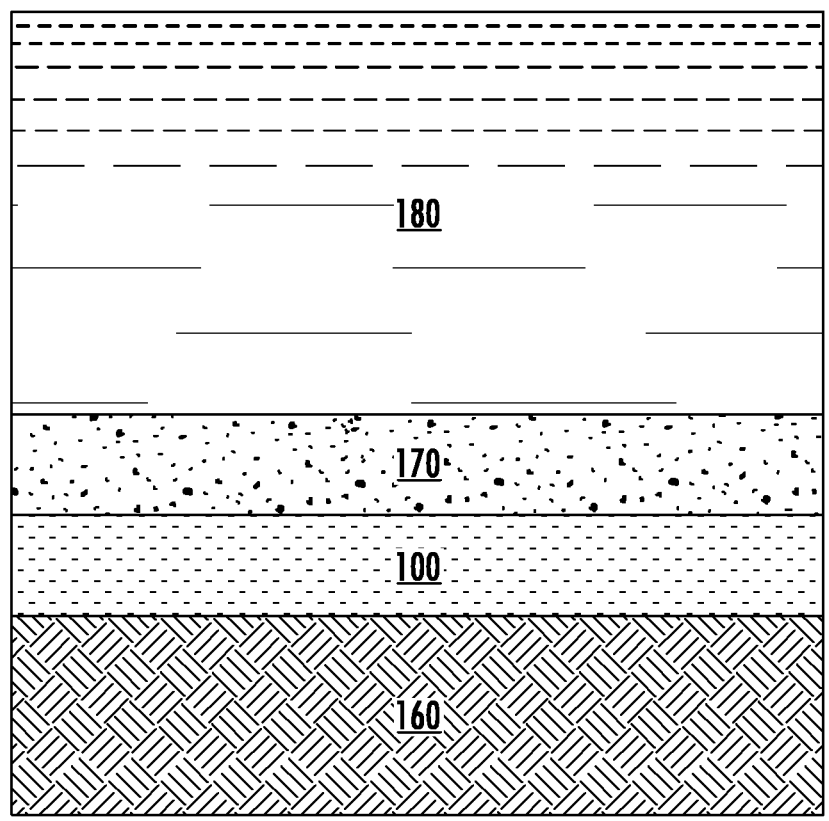
FIG. 3 is a schematic side view of the filtration system of FIG. 1, showing an example installation of the same to filter contaminants from contaminated soil in a body of water, in accordance with the disclosure herein.

FIG. 3 is a schematic cross-sectional view of an embodiment of the presently disclosed filtration system, comprising at least one geotextile mattress 100, which is installed adjacent to (e.g., on top of, relative to the direction of flow of the contaminated fluid emanating therefrom) a layer of contaminated sediment 160 that would otherwise be adjacent to, and leaching contaminated fluid into, a stream or body of water 180. In the embodiment shown, mattress 100 is covered with a layer of sand 170, which may be omitted in some embodiments. The layer of sand 170 can be provided to provide further positional stability to the mattress 100, to provide further particulate filtration of the filtration system, and/or to provide ultraviolet light protection to the filtration system.

Figure 4:
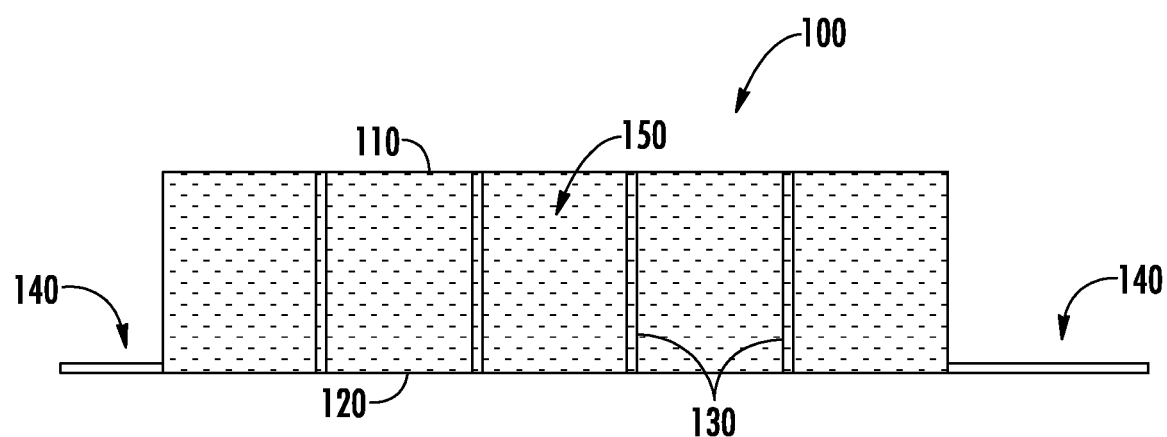
FIG. 4 is a schematic side view of an example embodiment of the filtration system of FIG. 1, further comprising an impermeable membrane attached to at least one of the lateral sides thereof, in accordance with the disclosure herein.

FIG. 4 is a side view of an embodiment of the presently disclosed filtration system comprising at least one geotextile mattress 100, with impermeable flaps, generally designated 140, attached to one or more of the sides of the mattress 100. In this embodiment, a plurality of straps 130 are provided uniformly throughout the width and/or length of the mattress 100 to connect the top geotextile layer 110 to the bottom geotextile layer 120 to prevent the mattress from having a substantially curved outer profile when filled will the filtration media, generally designated 150. The filtration media 150 is substantially uniformly distributed throughout the interior of the mattress 100, including about the interior straps 130. In this embodiment, the flaps 140 extend laterally away from the mattress 100. It is advantageous to use such flaps 140 in instances where adjacent mattresses 100 cannot be attached together or placed in sufficiently direct contact with each other, resulting in a gap being present between adjacent lateral edges of adjacent mattresses 100. In such embodiments, the flaps 140 extend to cover this gap to prevent a flow of contaminated fluid that would bypass the mattresses 100 through such gaps. The flaps can be secured to cover the gaps by the weight of the adjacent mattress 100 preventing movement of the flap 140 within the gap, or by other mechanism or means to secure the flaps in place. In some embodiments, the flap 140 can extend at least partially vertically up the lateral sides of one or more of the mattresses 100 to prevent the contaminated fluid from passing out of the sides of the mattress 100 without passing through a sufficient thickness of the mattress 100 to remove a sufficient amount of contaminants. In some embodiments, the flap 140 can have a thickness that is negligible (e.g., 10%, 5%, 2%, 1%, and the like) compared to the thickness of the mattress 100 to which the flap 140 is attached. In some other embodiments, the flap 140 has a thickness that can occupy a portion (e.g., up to 100%) of the thickness of the gap between the mattresses 100.

Figure 5:
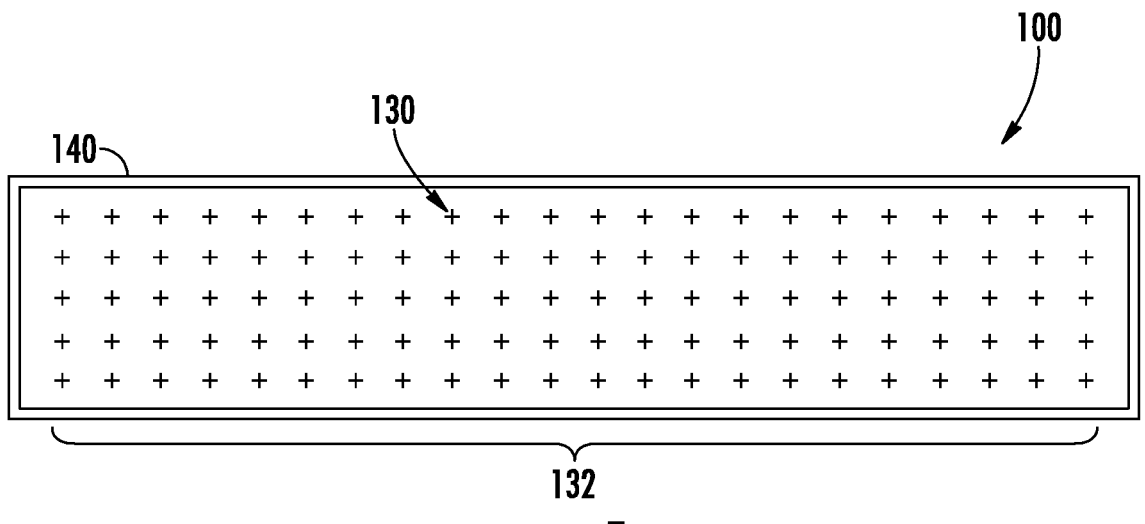
FIG. 5 is a schematic top view of an example embodiment of a filtration system having a substantially uniform distribution of interior straps within at least one mattress of the filtration system, in accordance with the disclosure herein.

FIG. 5 is a top view of an embodiment of a mattress 100, of which all of the lateral sides thereof have an extending flap 140 comprising an impermeable material, as disclosed elsewhere herein. In this embodiment, the interior straps 130 are schematically illustrated with a "+", at each of which one or more interior straps 130 may be provided to connect the top and bottom geotextile layers. The interior straps 130 are substantially uniformly distributed across the length and width of the mattress 100 in an array of interior straps 132.

Figure 6:
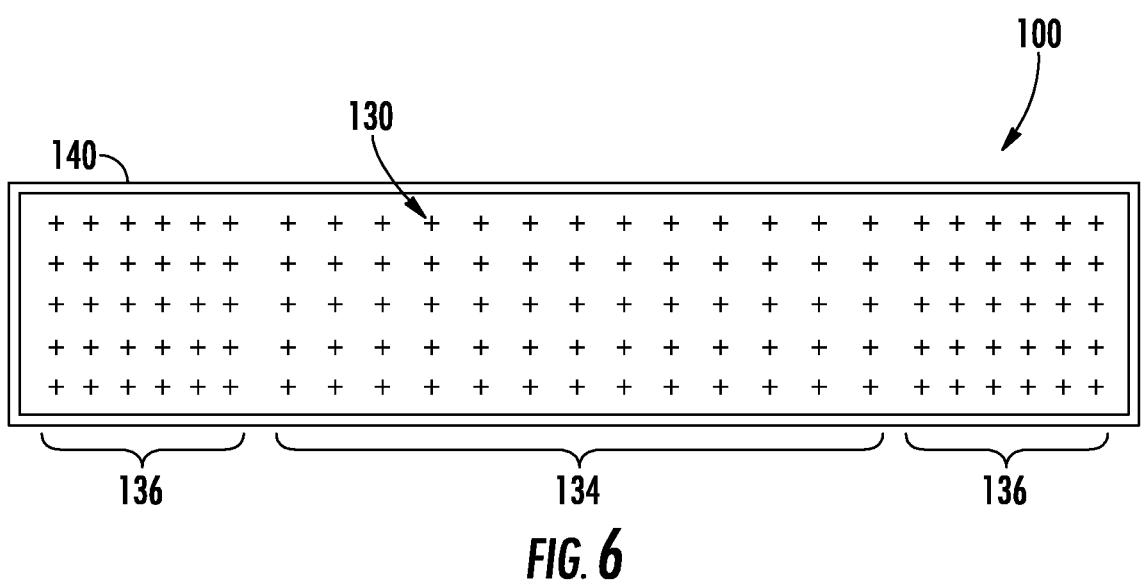
FIG. 6 is a schematic top view of an example embodiment of a filtration system having a non-uniform distribution of interior straps within at least one mattress of the filtration system, in accordance with the disclosure herein.

FIG. 6 is a top view of an embodiment of a mattress 100, of which all of the lateral sides thereof are covered, at least partially, by a flap 140 comprising an impermeable material, as disclosed elsewhere herein. In this embodiment, the interior straps 130 are schematically illustrated with a "+", at each of which one or more interior straps may be provided to connect the top and bottom geotextile layers. The interior straps 130 are non-uniformly distributed across the length and width of the mattress 100. In this embodiment, end regions 136 have an increased concentration of interior straps 130 within the mattress 100, while the central region 134 has a decreased concentration of interior straps 130 within the mattress 100, at least relative to end regions 136. Such increased concentrations of interior straps 130 can be advantageous, for example, to ensure that the mattress maintains its substantially uniform thickness in such regions where the filtration media might otherwise accumulate during filling or installation of the mattress (e.g., due to the effects of gravity, if the mattress 100 is installed, even partially, on an inclined surface).

Figure 7:
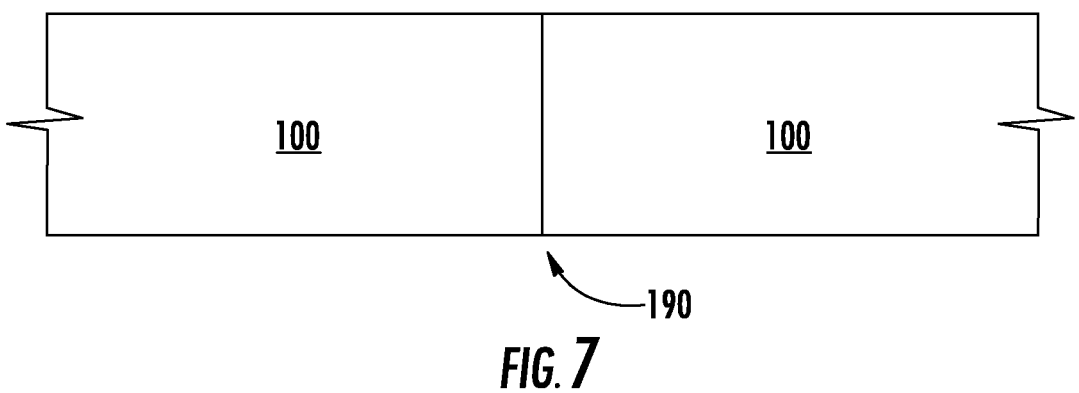
FIG. 7 is a schematic side view of an example embodiment of multiple filtration systems of FIG. 1 attached together in a substantially continuous arrangement, in accordance with the disclosure herein.

FIG. 7 is a schematic side view of a plurality of mattresses 100 that are connected together (e.g., at one or more lateral edge thereof) by a suitable fastener to form a substantially continuous layer of filtration media contained within adjacent connected mattresses 100. In some such embodiments, the fasteners 190 may comprise snaps, zippers (including industrial strength zippers), and the like that can be adhered to (e.g., sewn onto, formed in, attached to, etc.) one or more mattresses 100 in a filtration system, such that adjacent mattresses 100 can be zipped together to form a substantially continuous, unitary, monolithic, and/or uninterrupted layer of filtration media (e.g., contained within the mattresses 100).

In some embodiments, provided herein are methods for manufacturing a geotextile device capable of adsorbing, absorbing, reacting and/or sequestering contaminants from liquid emanating from groundwater and/or sediment porewater. Such methods of manufacture can comprise providing a water permeable geotextile material, forming a top layer and a bottom layer of such water permeable geotextile material, and connecting the top and bottom layers of water permeable geotextile material by sets or a plurality of interior geotextile straps or interconnecting components sewn or otherwise affixed to the top and bottom layers. To make the geotextile device an enclosed component, or otherwise create a mattress-like device with an interior space for containing an active material, four (or more) lateral sides can be created, in some embodiments from a same or different geotextile material, by folding the top or bottom layer and sewing that layer to the opposing top or bottom layer, respectively, or otherwise adding a portion of such geotextile material around the sides of the mattress being formed.

In some embodiments, the geotextile device can comprise a substantially planar mattress-like component with a defined and/or substantially uniform thickness (when filled), having an interior space with dimensions determined by the geometries of the interior straps located therein. In some embodiments, the interior straps can be spaced in a grid pattern at intervals of about 5 to about 30 cm. In some embodiments, such a method can further comprise adding impermeable flaps along the bottom side edges of the geotextile mattress.

In some embodiments, provided herein are methods for remediating contaminated sediments, ground water, and/or porewater. Such methods can comprise providing a filtration system comprising at least one filtration mattress, as disclosed elsewhere herein, placing or otherwise installing filtration system at a desired location in need of such remediation, and filling the interior of the device with an active material. In some embodiments, a layer of material, e.g. sand, can be overlaid to provide further stability to the mattress, to provide further filtration of the filtration system, and/or to provide ultraviolet light protection to the filtration system. Configurations of the disclosed filtration systems can be employed horizontally, substantially horizontally (e.g., ±1°, ±5°, ±10°, ±15°), inclined at an angled relative to a horizontal plane, substantially vertically, or any combinations thereof, by laying the filtration system over the affected area(s). The filtration system can remain in place to cap the affected area(s) for as long as is necessary to achieve the desired degree of remediation. Upon completion of the desired degree of remediation, the filtration system can be removed, thereby removing the contaminants sequestered therein from the previously affected area(s).

The terminology used herein is for the purpose of describing particular embodiments only and is not intended to be limiting of the presently disclosed subject matter.

While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one skilled in the art. While the following terms are believed to be well understood by one of ordinary skill in the art, the following definitions are set forth to facilitate explanation of the presently disclosed subject matter.

In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Following long-standing patent law convention, the terms "a", "an", and "the" refer to "one or more" when used in this application, including the claims. Thus, for example, reference to "a unit cell" includes a plurality of such unit cells, and so forth.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the terms "about" and "substantially," when referring to a value, an amount, or dimension (e.g. length, width, mass, weight, temperature, time, volume, concentration, percentage, etc.), is meant to encompass variations of, in some embodiments ±20%, in some embodiments ±10%, in some embodiments ±5%, in some embodiments ±1%, in some embodiments ±0.5%, and in some embodiments ±0.1% from the specified amount, as such variations may be deemed appropriate to perform the disclosed methods employ the disclosed compositions, or define the element(s) of the disclosed systems.

The term "comprising", which is synonymous with "including," "containing," or "characterized by," is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A filtration system, the filtration system comprising:
at least one mattress, the mattress comprising:
a top layer and a bottom layer made of a water permeable geotextile material, the water permeable geotextile material comprising a mass per area of about 100 grams/square meter ($g/m^2$) to about 800 $g/m^2$ to allow water and/or air to pass through while retaining a filtration media;
a plurality of sides that are connected to outer edges of the top and bottom layers of the mattress, thereby defining an outer perimeter of the mattress and enclosing an interior space of the mattress, wherein the plurality of sides are made of the water permeable geotextile material;
the plurality of sides of the mattress are formed from folded portions of the top layer that are sewn to the bottom layer and/or from folded portions of the bottom layer that are sewn to the top layer to form the mattress;
a plurality of straps positioned within the interior space of the mattress and connected to the top and bottom layers of the mattress to define a thickness of the mattress; and the filtration media within the interior space of the mattress, wherein the filtration media comprises a granular active material.

2. The filtration system according to claim 1, wherein the plurality of straps comprise geotextile straps attached to the top and bottom layers of the mattress.

3. The filtration system according to claim 2, wherein the plurality of geotextile straps are arranged in an array of geotextile straps across a length and a width of the mattress.

4. The filtration system according to claim 3, wherein the array of geotextile straps comprises a substantially uniform distribution of geotextile straps across the length and width of the mattress.

5. The filtration system according to claim 3, wherein the array of geotextile straps comprises a non-uniform distribution of geotextile straps across the length and/or width of the mattress.

6. The filtration system according to claim 1, wherein the granular active material comprises one of activated carbon, apatite, iron sulfide, organophilic day, siderite, zeolite, zero valent iron, and mixtures thereof.

7. The filtration system according to claim 1, wherein the filtration media comprises one or more active materials mixed with sand.

8. The filtration system according to claim 1, wherein the filtration media has a particle size such that at least 90% of the particles are in the range of about 4 to about 200 mesh.

9. The filtration system according to claim 1, wherein a density of the filtration media within the mattress is from about 20 pounds per cubic foot ($lb/ft^3$) to about 200 $lb/ft^3$.

10. The filtration system according to claim 1, comprising a plurality of mattresses installed adjacent to each other to substantially entirely cover a contaminated area to be remediated.

11. The filtration system according to claim 10, wherein adjacent mattresses are attached together to form a substantially continuous filtration layer of the contaminated area.

12. The filtration system according to claim 11, comprising one or more flaps attached to one or more sides of at least one of the plurality of mattresses, wherein the flaps comprise an impermeable material configured to prevent fluid from passing between adjacent mattresses where such flaps are located between adjacent mattresses.

13. The filtration system according to claim 10, comprising a layer of material overlaid onto the plurality of mattresses to provide further stability to the mattress, to provide further filtration of the filtration system, and/or to provide ultraviolet light protection to the filtration system.

14. The filtration system according to claim 1, wherein the water permeable geotextile material is a woven geotextile material, in which yarns of the woven geotextile material in a machine direction can be a different polymer than yarns of the woven geotextile material in a cross-machine direction.

15. A method of manufacturing a filtration system for adsorbing, absorbing, reacting, and/or sequestering contaminants from liquid emanating from groundwater and/or sediment porewater, the filtration system comprising a mattress, the method comprising:
providing a water permeable geotextile material, the water permeable geotextile material comprising a mass per area of about 100 grams/square meter ($g/m^2$) to about 800 $g/m^2$ to allow water and/or air to pass through while retaining a filtration media;
forming a top layer and a bottom layer of the mattress from the geotextile material;
connecting a plurality of sides to outer edges of the top and bottom layers of the mattress, thereby defining an outer perimeter of the mattress and enclosing an interior space of the mattress, wherein the plurality of sides are made of the water permeable geotextile material and the plurality of sides of the mattress are formed from folded portions of the top layer that are sewn to the bottom layer and/or from folded portions of the bottom layer that are sewn to the top layer to form the mattress;
connecting the top and bottom layers of the mattress together via a plurality of straps positioned within the interior space of the mattress, wherein the plurality of straps define a thickness of the mattress; and
filling, at least partially, the interior space of the mattress with the filtration media to remove the contaminants from liquid passing through the mattress, wherein the filtration media comprises a granular active material.

16. The method according to claim 15, wherein the plurality of straps comprise geotextile straps attached to the top and bottom layers of the mattress.

17. The method according to claim 15, wherein the plurality of geotextile straps are arranged in an array of straps across a length and a width of the mattress.

18. The method according to claim 17, wherein the array of geotextile straps are spaced apart at intervals of about 5 to about 30 cm.

19. The method according to claim 17, wherein the array of geotextile straps comprises a substantially uniform distribution of straps across the length and width of the mattress.

20. The method according to claim 17, wherein the array of geotextile straps comprises a non-uniform distribution of straps across the length and/or width of the mattress.

21. The method according to claim 15, comprising attaching flaps comprising an impermeable material along bottom side edges of the mattress.

22. A method of remediating contaminated sediments, groundwater, and/or porewater, the method comprising:
providing a filtration system having a mattress comprising:
a top layer and a bottom layer made of a water permeable geotextile material, the water permeable geotextile material comprising a mass per area of about 100 grams/square meter ($g/m^2$) to about 800 $g/m^2$ to allow water and/or air to pass through while retaining a filtration media;
a plurality of sides that are connected to outer edges of the top and bottom layers of the mattress, thereby defining an outer perimeter of the mattress and enclosing an interior space of the mattress, wherein the plurality of sides are made of the water permeable geotextile material and the plurality of sides of the mattress are formed from folded portions of the top layer that are sewn to the bottom layer and/or from folded portions of the bottom layer that are sewn to the top layer to form the mattress;
a plurality of straps positioned within the interior space of the mattress and connected to the top and bottom layers of the mattress to define a thickness of the mattress;
placing or otherwise installing the filtration system over a contaminated area requiring remediation;
filling the interior space of each mattress with the filtration media, wherein the filtration media comprises a granular active material; and
overlaying a layer of material on the filtration system to provide a further stability to the filtration system, to provide a further filtration of the filtration system, and/or to provide ultraviolet light protection to the filtration system.

23. The method according to claim 22, wherein the filtration system further comprises a plurality of mattresses installed laterally adjacent to each other to cover the contaminated area.

24. The method according to claim 23, comprising attaching adjacent mattresses of the plurality of mattresses to each other via one or more fasteners to form a substantially continuous layer of mattresses over the contaminated area.

25. The method according to claim 24, comprising attaching one or more flaps to one or more sides of at least one of the plurality of mattresses, wherein the flaps comprise an impermeable material to prevent fluid from passing between adjacent mattresses where such flaps are located between adjacent mattresses.

26. The method according to claim 23, comprising installing the plurality of mattresses horizontally or substantially horizontally.

* * * * *